US012228125B2

United States Patent
Smith et al.

(10) Patent No.: US 12,228,125 B2
(45) Date of Patent: Feb. 18, 2025

(54) LUBRICATION AND FLUSHING OF A FLUID SEAL USED WITH REACTIVE MATERIALS

(71) Applicant: Graco Minnesota Inc., Minneapolis, MN (US)

(72) Inventors: Matthew R. Smith, Minneapolis, MN (US); Nicholas P. Peterson, Coon Rapids, MN (US); Joseph E. Tix, Hastings, MN (US); Andrew M. Spiess, White Bear Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 117 days.

(21) Appl. No.: 17/565,848

(22) Filed: Dec. 30, 2021

(65) Prior Publication Data

US 2022/0412340 A1 Dec. 29, 2022

Related U.S. Application Data

(60) Provisional application No. 63/240,481, filed on Sep. 3, 2021, provisional application No. 63/216,120, filed on Jun. 29, 2021.

(51) Int. Cl.
*F04B 49/02* (2006.01)
*F04B 23/10* (2006.01)
(Continued)

(52) U.S. Cl.
CPC .............. *F04B 49/02* (2013.01); *F04B 23/10* (2013.01); *F04B 43/12* (2013.01); *F04B 53/18* (2013.01)

(58) Field of Classification Search
CPC .......... F04B 23/10; F04B 23/12; F04B 43/12; F04B 53/18; F04B 49/02
See application file for complete search history.

(56) References Cited

U.S. PATENT DOCUMENTS

| 2,628,112 A | 2/1953 | Hebard |
| 2,650,116 A | 8/1953 | Robert |

(Continued)

FOREIGN PATENT DOCUMENTS

| WO | 2015021252 A1 | 2/2015 |
| WO | 2015161258 A1 | 10/2015 |

(Continued)

OTHER PUBLICATIONS

Extended European Search Report for EP Application No. 22181938.6, dated Nov. 24, 2022, 10 pages.

*Primary Examiner* — Connor J Tremarche
(74) *Attorney, Agent, or Firm* — Kinney & Lange, P.A.

(57) ABSTRACT

A pump system includes a housing, a lubricant system, and control circuitry. The housing includes a pump chamber defined by the housing and a throat seal. The lubricant system includes a lubricant pump, a lubricant gallery defined within the housing of the main pump, and a lubricant circuit fluidly connecting the lubricant pump and the lubricant gallery. The throat seal is disposed adjacent to and between the pump chamber and the lubricant gallery. The control circuitry is configured to cause the lubricant pump to pump a purge volume of lubricant through the lubricant system, cause the lubricant pump to stop pumping for a first time period after the lubricant pump has pumped the purge volume, and cause the lubricant pump to pump the purge volume of lubricant through the lubricant system after the first time period.

19 Claims, 7 Drawing Sheets

(51) Int. Cl.
    *F04B 43/12*        (2006.01)
    *F04B 53/18*        (2006.01)

(56) References Cited

U.S. PATENT DOCUMENTS

| | | | |
|---|---|---|---|
| 3,602,613 A | | 8/1971 | Gunther et al. |
| 4,633,976 A | | 1/1987 | Waki et al. |
| 5,072,949 A | | 12/1991 | Lopperi |
| 5,282,704 A | * | 2/1994 | Screen ............. B25H 1/0071 |
| | | | 408/124 |
| 8,191,460 B2 | | 6/2012 | Tackett et al. |
| 8,505,924 B2 | | 8/2013 | Dietle et al. |
| 9,366,372 B2 | | 6/2016 | Nakazono et al. |
| 9,605,506 B1 | * | 3/2017 | Jameson ............... F16N 19/006 |
| 9,776,158 B2 | | 10/2017 | Nguyen et al. |
| 10,173,232 B2 | | 1/2019 | Van Keulen |
| 10,288,080 B2 | | 5/2019 | Aguilar et al. |
| 10,300,504 B2 | | 5/2019 | Fehr et al. |
| 2002/0125074 A1 | | 9/2002 | Roehrborn |
| 2014/0297045 A1 | * | 10/2014 | Apostolides ............ F04B 49/00 |
| | | | 700/282 |
| 2017/0037848 A1 | | 2/2017 | Robison et al. |
| 2017/0233641 A1 | * | 8/2017 | Singh ....................... C09K 8/10 |
| | | | 166/308.5 |
| 2017/0370524 A1 | * | 12/2017 | Wagner ................... F04B 23/02 |
| 2018/0112776 A1 | | 4/2018 | Nijaguna et al. |
| 2018/0347601 A1 | | 12/2018 | Hoffman et al. |
| 2019/0301448 A1 | | 10/2019 | Lanie et al. |
| 2019/0301673 A1 | | 10/2019 | Li et al. |

FOREIGN PATENT DOCUMENTS

| | | |
|---|---|---|
| WO | 2017127427 A1 | 7/2017 |
| WO | 2020003206 A1 | 1/2020 |
| WO | 2021116100 A1 | 6/2021 |

* cited by examiner

LUBRICATION AND FLUSHING OF A FLUID SEAL USED WITH REACTIVE MATERIALS

CROSS-REFERENCE TO RELATED APPLICATIONS

This application claims the benefit of U.S. Provisional Application No. 63/216,120, filed Jun. 29, 2021 for "CONTROLLER FOR LUBRICATION AND FLUSHING OF A FLUID SEAL USED WITH REACTIVE MATERIALS" by M. Smith, N. Peterson, J. Tix, and A. Spiess. This application also claims the benefit of U.S. Provisional Application No. 63/240,481, filed Sep. 3, 2021 for "LUBRICATION AND FLUSHING OF A FLUID SEAL USED WITH REACTIVE MATERIALS" by M. Smith, N. Peterson, J. Tix, and A. Spiess.

BACKGROUND

The present disclosure relates to pump lubrication systems and, more particularly, to control systems for pump lubricant systems.

Positive displacement pumps, such as reciprocating pumps, are generally provided with seals to reduce leakage from the pump chamber toward the piston rod, protecting the piston rod and other pump components from degradation or corrosion. To improve seal longevity, the pump can include a lubricant gallery to store lubricant for lubricating the seal. The lubricant held in the lubricant gallery can be used to lubricate the seal during operation of the pump, reducing seal wear and thereby improving seal lifespan. Lubricant held in the lubricant gallery can become contaminated with fluid from the pump chamber. Contaminated lubricant can be circulated out of out of the lubricant gallery and replaced with fresh lubricant, extending the lifespan of the seal.

SUMMARY

According to one aspect of the present disclosure, a pump system includes a housing, a lubricant system, and control circuitry. The housing includes a pump chamber defined by the housing and a throat seal. The lubricant system includes a lubricant pump, a lubricant gallery defined within the housing of the main pump, and a lubricant circuit fluidly connecting the lubricant pump and the lubricant gallery. The throat seal is disposed adjacent to and between the pump chamber and the lubricant gallery. The control circuitry is configured to cause the lubricant pump to pump a purge volume of lubricant through the lubricant system, cause the lubricant pump to stop pumping for a first time period after the lubricant pump has pumped the purge volume, and cause the lubricant pump to pump the purge volume of lubricant through the lubricant system after the first time period.

According to another aspect of the present disclosure, a pump control system includes a main pump configured to pump a fluid and control circuitry. The main pump includes a housing, a pump chamber defined by the housing, and a throat seal. The control circuitry is configured to cause the main pump to pump a fluid through the pump chamber, cause a lubricant pump to pump a purge volume of lubricant through a lubricant system, cause the lubricant pump to stop pumping for a first time period after the lubricant pump has pumped the purge volume, and cause the lubricant pump to pump the purge volume of lubricant through the lubricant system after the first time period. The lubricant system includes the lubricant pump, a lubricant gallery defined by the housing, and a lubricant circuit fluidly connecting the lubricant pump and the lubricant gallery. The throat seal is disposed adjacent to and between the pump chamber and the lubricant gallery.

According to another aspect of the present disclosure, a method of controlling a pump system includes operating a lubricant pump to pump a purge volume of lubricant through a lubricant system, stopping operation of the lubricant pump for a first time period after the lubricant pump has pumped the purge volume, and operating the lubricant pump to pump a second purge volume of lubricant through the lubricant system after the first time period. The lubricant system includes the lubricant pump, a lubricant gallery defined by a housing of a main pump, and a lubricant circuit fluidly connecting the lubricant pump and the lubricant gallery. The main pump includes a pump chamber defined by the housing and a throat seal disposed adjacent to and between the pump chamber and the lubricant gallery.

DETAILED DESCRIPTION

The present disclosure includes lubricant systems for throat seals of fluid pumps. The present disclosure further includes control systems for controlling the operation of the lubricant systems and fluid pumps disclosed herein. The lubricant systems and control systems disclosed herein reduce the undesirable agitation of lubricant while also ensuring adequate lubricant flow to the throat seal of a fluid pump.

Figure 1:
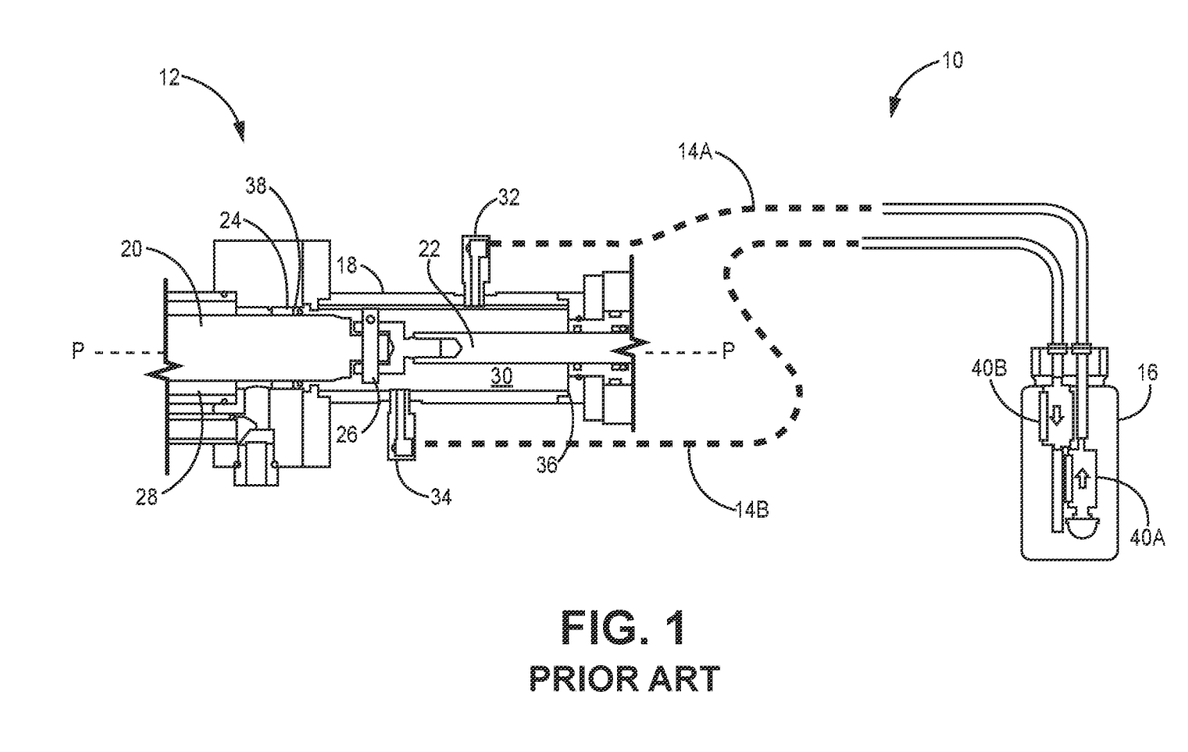
FIG. 1 is a schematic cross-sectional depiction of an example of a lubricant system.

FIG. 1 is a cross-sectional view of lubricant system 10, which is a prior art system for pumping lubricant. Lubricant system 10 is a closed lubrication system and includes main pump 12, lubricant lines 14A and 14B, and lubricant reservoir 16. Pump 12 is a reciprocating pump and includes pump housing 18, piston 20, rod 22, throat seal 24, and attachment point 26. Pump housing 18 defines pump chamber 28, lubricant gallery 30, and inlet 32, outlet 34. Lubricant gallery 30 includes first end 36 and second end 38. Lubricant reservoir 16 includes check valves 40A and 40B.

Main pump 12 is configured to pump a process fluid through pump chamber 28 using reciprocation of piston 20 and rod 22. Rod 22 and piston 20 are disposed within pump housing 18, connected at attachment point 26, and centered on axis P-P. In operation, an external motor attached to rod 22 can cause piston 20 and rod 22 to reciprocate along pump axis P-P, creating fluid flow through pump chamber 28 of main pump 12. The process fluid pumped through pump chamber 28 of main pump 12 is generally a material other than a lubricant. The difference in diameter between piston 20 and rod 22 causes piston 20 to displace lubricant from lubricant gallery 30 as piston 20 and rod 22 reciprocate along axis P-P, generating pumping power. In this manner, the reciprocation of piston 20 and rod 22 functions both to create pump process fluid through pump chamber 28 and to pump lubricant through lubricant system 10.

Lubricant gallery 30 is a substantially cylindrical chamber defined by an interior surface of pump housing 18 and is centered on axis P-P and extends from first end 36 to second end 38. Lubricant gallery surrounds a portion of rod 22, a portion of piston 20, and attachment point 26. Lubricant gallery stores lubricant that is used to lubricate throat seal 24, preventing damage to throat seal 24 from the reciprocation of piston 20. Lubricant gallery includes first end 36 and second end 38, which define the axial ends of lubricant gallery 30. First end 36 is formed by pump housing 18 and second end 38 is formed by throat seal 24. Piston 20 extends through and throat seal 24 is disposed adjacent to second end 38. Rod 22 extends through and throat seal 24 is disposed opposite first end 36.

Throat seal 24 is an annular seal that is centered on axis P-P and surrounds a portion of piston 20 and reduces flow of the process fluid pumped by piston 20 from pump chamber 28 into lubricant gallery 30. Lubricant gallery 30 is an annular chamber centered on axis P-P that holds a lubricant for lubricating throat seal 24. Throat seal 24 mitigates but does not prevent flow of process fluid from pump chamber 28 into lubricant gallery 30. Consequently, process fluid from pump chamber 28 can migrate past throat seal 24 and contaminate lubricant held in lubricant gallery 30 during operation of pump 12. Contamination of lubricant in lubricant gallery 30 can cause degradation of throat seal 24, rod 22, or other components of pump 12, adversely affecting the performance of pump 12.

Lubricant reservoir 16 includes check valves 40A and 40B. Lubricant reservoir is generally sized such that the volume of lubricant stored in lubricant reservoir 16 is significantly larger than the volume of lubricant held in lubricant gallery 30. This allows contaminated lubricant in lubricant gallery to be diluted in the lubricant held in lubricant reservoir 16, delaying the onset of negative effects of lubricant contamination, as will be explained in more detail subsequently.

Lubricant line 14A fluidly connects lubricant reservoir 16 to inlet 32 of lubricant gallery 30 and lubricant line 14B fluidly connects outlet 34 of lubricant gallery 30 to lubricant reservoir 16. As such, lubricant can flow in a circuit from lubricant reservoir 16 through lubricant line 14A and inlet 32 to lubricant gallery 30, and from lubricant gallery 30 through outlet 34 and lubricant line 14B to lubricant reservoir 16.

In operation, as piston 20 moves out of lubricant gallery 30 (i.e., as attachment point 26 moves toward second end 38 of lubricant gallery 30), lubricant is drawn into lubricant gallery 30 from lubricant reservoir 16 through lubricant line 14A. As piston 20 reciprocates and moves into lubricant gallery 30 (i.e., as attachment point 26 moves toward first end 36 of lubricant gallery 30), lubricant flows from lubricant gallery 30 to lubricant reservoir 16 through lubricant line 14B.

To enforce directional flow through lubricant system 10, check valves 40A and 40B are included at lubricant reservoir 16. Check valve 40A is a one-way valve that is configured to allow fluid to flow from lubricant reservoir 16 through lubricant line 14A to inlet 32 and prevent backward flow from inlet 32 of lubricant gallery 30 through lubricant line 14A to lubricant reservoir 16. Similarly, check valve 40B is a one-way valve that is configured to allow fluid to flow from outlet 34 through lubricant line 14B to lubricant reservoir 16 and prevent backward flow from lubricant reservoir 16 through lubricant line 14B to outlet 34. The operation of check valves 40A and 40B causes lubricant to flow through lubricant system 10 according to the direction of arrows 42.

Circulation of lubrication through lubrication system 10 reduces the effects of contamination of lubricant gallery 30 by washing contaminated lubricant away from throat seal 24 and diluting the contaminated lubricant in lubricant reservoir 16. The volume of lubricant stored in lubricant reservoir 16 is generally significantly larger than the volume of lubricant held in lubricant gallery 30, such that circulation of lubricant through lubricant system 10 dilutes contaminated lubricant from lubricant gallery 30 in the larger volume of lubricant held in lubricant reservoir 16, thereby delaying onset of adverse effects caused by lubricant contamination.

Figure 2:
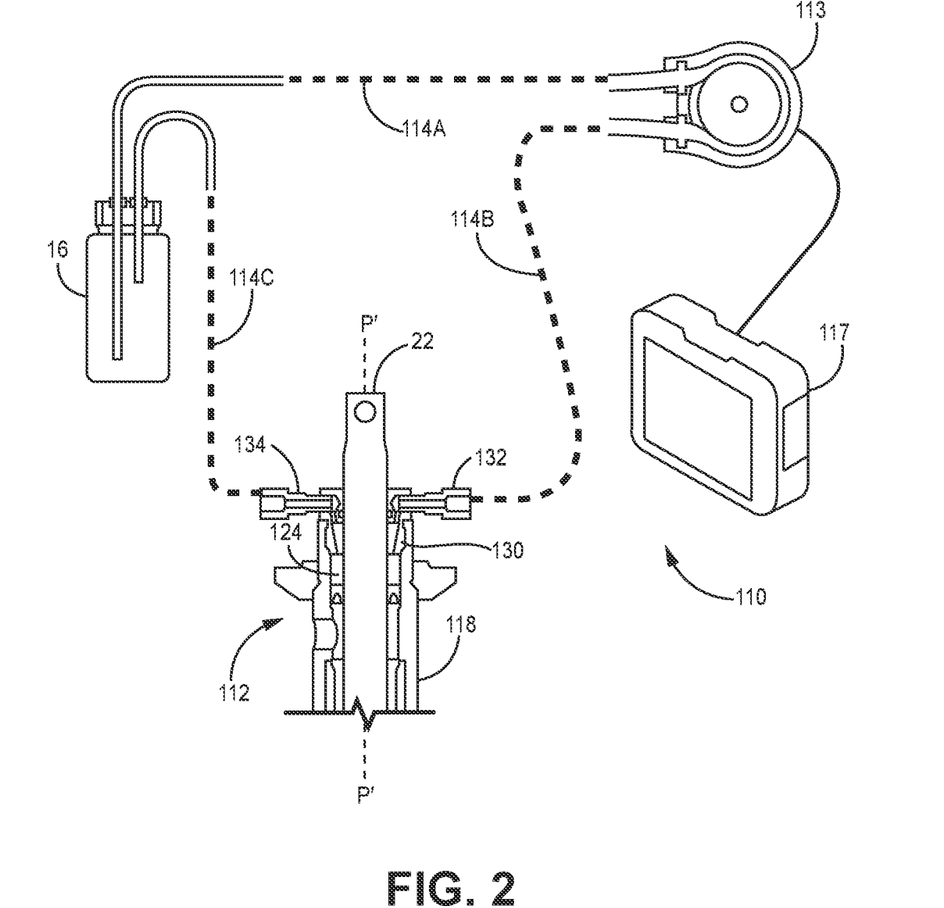
FIG. 2 is a schematic cross-sectional depiction of a further example of a lubricant system

FIG. 2 is a cross-sectional view of lubricant system 110, which is similar to lubricant system 10 and includes main pump 112, lubricant pump 113, lubricant lines 114A-C, lubricant reservoir 16, and controller 117. Main pump 112 is substantially the same as pump 12 and includes pump housing 118, throat seal 124, and rod 22. Pump housing 118 defines pump chamber 128 (shown in FIG. 3), lubricant gallery 130, inlet 132, and outlet 134. To improve clarity of FIG. 2, piston 20 and attachment point 26 are not shown in FIG. 2.

Unlike lubricant system 10, lubricant system 110 does not use the differential area of piston 20 and rod 22 to pump lubricant through lubricant system 110. Rather, lubricant system 110 uses lubricant pump 113 to pump lubricant, decoupling the flow of lubricant from the pumping action of main pump 112.

Main pump 112 is configured to pump a process fluid through pump chamber 128 using reciprocation of piston 20 and rod 22. In operation, an external motor attached to rod 22 can cause piston 20 and rod 22 to reciprocate along pump axis P-P, creating fluid flow through pump chamber 28 of main pump 112. Main pump 112 can be used in combination with another main pump to pump one material component of plural component spray material, as discussed in more detail with respect to FIG. 3.

Lubricant gallery 130 is substantially similar to lubricant gallery 30, as described previously with respect to FIG. 1. Lubricant gallery 130 stores lubricant for lubricating throat seal 124, is a substantially cylindrical chamber defined by an interior surface of pump housing 118, and is centered on axis P'-P'. Unlike lubricant gallery 30, lubricant gallery 130 only surrounds a portion of rod 22. Further, Throat seal 124 is substantially similar to throat seal 24, as described previously with respect to FIG. 1, but surrounds a portion of rod 22 rather than a portion of piston 20. Throat seal 124 is an annular seal that is centered on axis P-P and functions to reduce flow of the process fluid pumped by piston 20 from pump chamber 128 into lubricant gallery 130.

As piston 20 is not required to reciprocate through lubricant gallery 30 to create pumping action through lubricant system 110, positioning throat seal 124 to surround a portion of rod 22 rather than a portion of piston 20 functions to prevent additional, unwanted pumping action that could be created by the reciprocation of piston 20 through lubricant gallery 30. Flow of lubricant through lubricant system 110 is consequently controlled entirely by operation of lubricant pump 113, as will be explained in more detail subsequently. Disposing throat seal 124 about a portion of rod 22 rather than a portion of piston 20 also allows lubricant gallery 130 to have a reduced volume as compared to lubricant gallery 30, as the flow rate of lubricant through lubricant system 110 is driven by a standalone lubricant pump 113 rather than displacement of lubricant in lubricant gallery 130 by piston 20.

Lubricant line 114A fluidly connects lubricant reservoir 16 and lubricant pump, lubricant line 114B fluidly connects lubricant pump 113 and inlet 132 of lubricant gallery 130, and lubricant line 114C fluidly connects outlet 134 of lubricant gallery 130 and lubricant reservoir. As such, lubricant can flow in a circuit from lubricant reservoir 16 through lubricant line 114A to lubricant pump 113, from lubricant pump 113 through lubricant line 114B and inlet 132 to lubricant gallery 130, and from lubricant gallery 130 through outlet 134 and lubricant line 114C to lubricant reservoir 16.

Lubricant pump 113 creates pumping action and causes lubricant to flow from lubricant reservoir 16 to lubricant gallery 130 and from lubricant gallery 130 to lubricant reservoir 16. In the depicted example, lubricant pump 113 is a peristaltic pump and suitable for being driven by a fixed-speed electric motor. However, lubricant pump 113 can be any suitable pump for pumping fluid through lubricant system 110. Similarly, lubricant pump 113 can also be driven by a variable-speed motor. Advantageously, inclusion of separate lubricant pump 113 allows for control of the flow of lubricant independent of the operation of main pump 12.

Operation of lubricant pump 113 is controlled by controller 117, which can be used to start, stop, or adjust the operation of lubricant pump 113 and the flow of lubricant as required for a given application. Controller 117 can also be used to detect fault conditions and determine a maintenance cycle based on the usage of lubricant pump 113. Controller 117 can be connected to one or more temperature sensors (not shown) disposed at one or more locations in lubricant system 110 and can be configured to monitor the temperature of lubricant as it is pumped by lubricant 113. Similarly, controller 117 can be connected to one or more pressure sensors (not shown) disposed at one or more locations in lubricant system 110 and can be configured to monitor the pressure of lubricant as it is pumped by lubricant 113. Controller 117 can be further configured to detect leaks or blockages within lubricant system 110 based on the measured pressure and to alert an operator when lubrication system 110 has a leak or when leaked process fluid from pump chamber 128 has created a blockage. For example, controller 117 can be configured to compare the measured pressure to a baseline or reference pressure to determine if there is a leak or blockage within lubricant system 110.

Operation of main pump 112 causes flow of process fluid through pump chamber 128 and does not affect flow of lubricant through lubricant gallery 130. Operation of lubricant pump 113 causes lubricant to flow from lubricant reservoir through lubricant line 114A to lubricant pump 113, from lubricant pump 113 through lubricant line 114B to inlet 132 of lubricant gallery 130, and from outlet 134 of lubricant gallery though lubricant line 114C to lubricant reservoir 16. To this extent, operation of lubricant pump 113 allows for dilution of contaminated lubricant from lubricant gallery 130 to lubricant reservoir.

In lubricant system 110, operation of lubricant pump 113 enforces directional flow. To this extent, lubricant system 110 does not require check valves 40A and 40B. Check valves 40A and 40B can fail during operation of lubricant system 10, allowing backward flow through lubricant system 10. To this extent, use of lubricant pump 113 improves the reliability of lubricant system 110 over conventional systems, such as lubricant system 10, that rely on check valves to create directional flow.

Although lubricant system 110 has been discussed as relating to lubricant pumps for throat seals, lubricant system 110 can be adapted for any pump or valve seal. Similarly, lubricant system 110 is not limited to seals of reciprocating or positive-displacement pumps, and can be adapted to provide lubrication to seals of any pump systems.

Lubricant system 110 provides a number of advantages over the lubricant system 10 described previously with respect to FIG. 1. Particularly, lubricant system 110 uncouples and allows for independent control of the flow of process fluid through pump chamber 128 and the flow of lubricant through lubricant gallery 130. Independent control of lubricant pump 113 allows, for example, lubricant to be pumped when main pump 112 is inactive. Lubricant system 110 thereby allows for finer-tuned and more granular control of the flow of lubricant, relative to conventional systems.

Figure 3:
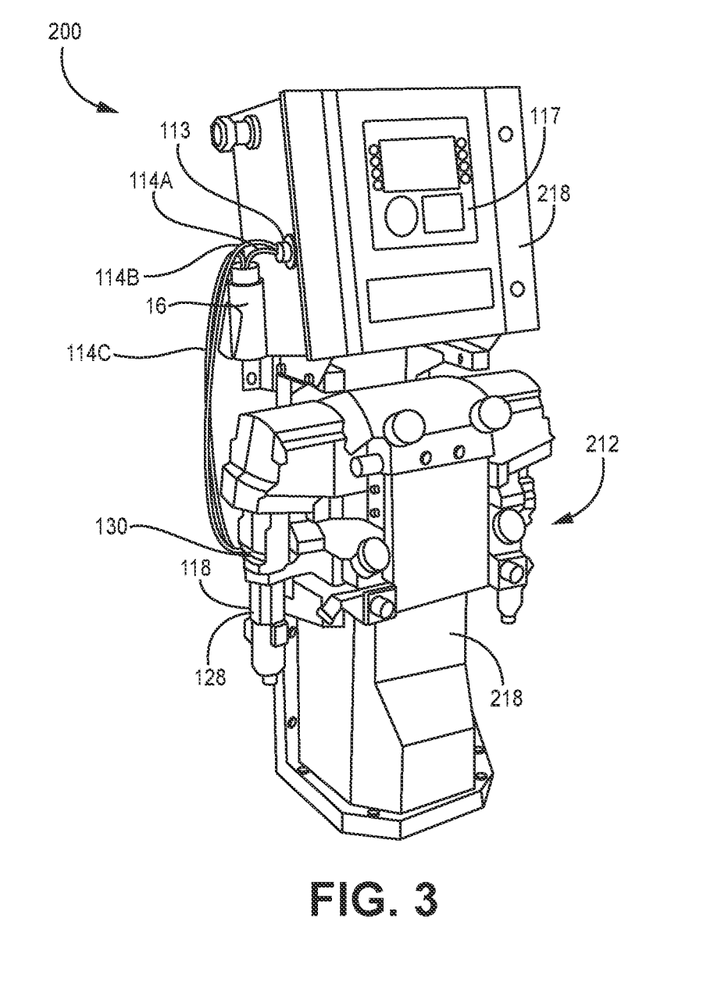
FIG. 3 is a perspective view of an example of a proportioning system.

FIG. 3 is a perspective view of proportioner system 200, which is an example of a plural component dispensing system. Proportioner system 200 includes lubricant system 110 including (main pump 112, lubricant pump 113, lubricant lines 114A-C, lubricant reservoir 16, and controller 117), main pump 212, and proportioner housing 218.

Main pump 212 has substantially the same components and operates in substantially the same manner as main pump 112. In proportioner system 200, main pumps 112 and 212 are disposed on opposite sides of proportioner housing 218 and are configured to pump a first component material and a second component material, respectively. Main pump 112 and main pump 212 pump the first component material and the second component material, respectively, to an applicator (not depicted) to form a spray material. Further, main pump 112 and main pump 212 increase the pressure of the first and second component materials, respectively, to a spray pressure. The first and second components are different materials that are selected to combine to form a plural component spray material having desired material properties, such as a spray foam. Generally, mixing the first and second components causes a reaction that forms a plural component spray material that can be sprayed by the applicator. The first and second components are mixed at the applicator rather than an upstream location of proportioner system 200 to prevent unwanted reactions that can damage components of proportioner system 200.

The first component material can be a catalyst, such as isocyanate, and the second component material can be a resin material, such as a polyol resin. In examples where isocyanate and polyol resin are used as the first and second component materials, respectively, the plural component spray material is a polyurethane foam. Other components can be used as a resin material based on the needs of the application. For example, the resin material can be a urethane or silicone material for some applications. Similarly, other catalyst materials can be selected based on application needs.

Main pumps 112 and 212 receive the first component material and second component material, respectively, from feed pumps (not shown) that pump the first and second component materials from reservoirs (not shown) of each component. Main pumps 112 and 212 are mechanically linked such that the ratio of the first and second component materials is fixed. Main pump 112 and main pump 212 can be driven by separate motors or a single motor can be used to drive both main pump 112 and main pump 212. In FIG. 3, main pump 112 and main pump 212 are both depicted as reciprocating pumps, but main pumps 112, 212 can be any suitable type of pump for dispensing a fluid component material.

In proportioner system 200, controller 117 also controls the operation of main pump 112 and main pump 212. Controller 117 can be further configured to measure and control the temperature and/or pressure of the first component material, the second component material, or the spray material.

In the depicted example, lubricant pump 113 and lubricant reservoir 16 are disposed adjacent and are attached to the exterior of proportioner housing 218 above main pump 112. In other examples, lubricant pump 113 and lubricant reservoir 16 can be disposed elsewhere on proportioner housing 218 or can be disposed at other suitable locations such that lubricant pump 113 and/or lubricant reservoir 16 are not attached to proportioner housing 218. Controller 117 is depicted in FIG. 3 as mounted within proportioner housing 218. In other examples, controller 117 can be disposed at other locations, including locations outside of proportioner housing 218. Other components used for the operation of proportioner system 200 can also be disposed within proportioner housing 218. For example, one or more motors for driving the operation of main pumps 112 and 212 can be disposed within proportioner housing 218.

Advantageously, proportioner system 200 allows for reactive component materials to be pumped separately and combined downstream of main pumps 112 and 212 to form a plural component spray material. To this extent, proportioner system 200 allows control of the ratios, temperatures, and pressures of the fluid components pumped by main pumps 112 and 212. As proportioner system 200 includes lubricant system 110, proportioner system 200 also has the advantages outlined previously with respect to the discussion of FIG. 2.

Figure 4:
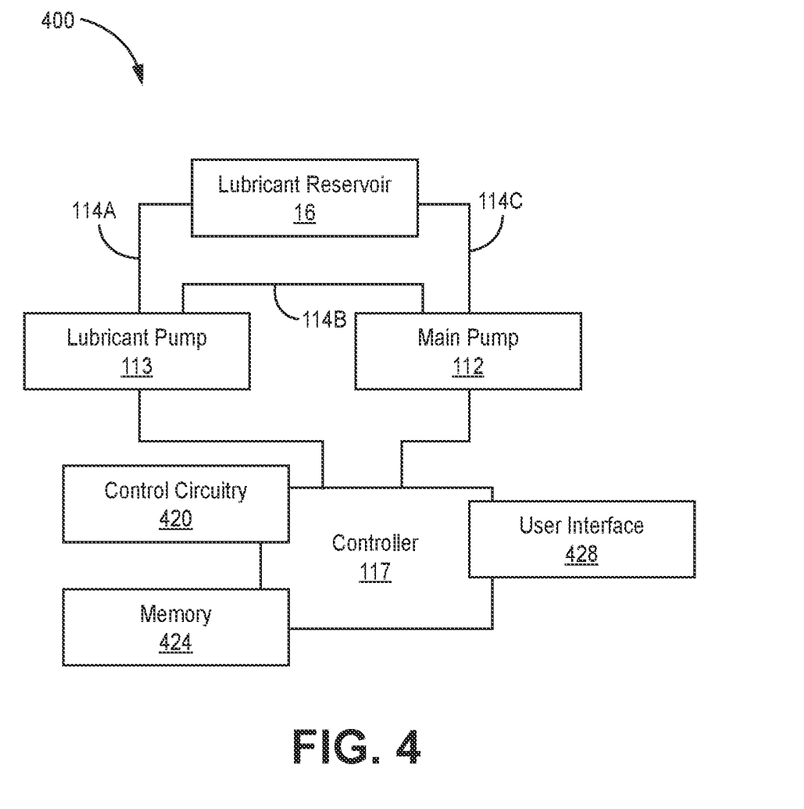
FIG. 4 is a schematic of an example of a control system for controlling the operation of the lubricant system depicted in FIG. 2.

FIG. 4 is a schematic depiction of control system 400, which includes controller 117, lubricant pump 113, lubricant reservoir 16, lubricant lines 114A-C, and main pump 112. Controller 117 includes control circuitry 420, memory 424, and user interface 428.

Control circuitry 420 is configured to control the operation of lubricant pump 113 and main pump 112 by executing instructions stored on memory 424. Control circuitry 420 can include one or more of a microprocessor, a controller, a digital signal processor (DSP), an application specific integrated circuit (ASIC), a field-programmable gate array (FPGA), or other equivalent discrete or integrated logic circuitry. Control circuitry 420 can be entirely or partially mounted on one or more boards. Control circuitry 420 can be of any type suitable for operating in accordance with the techniques described herein. In some examples, control circuitry 420 can be implemented as a plurality of discrete circuitry subassemblies.

Memory 424 is configured to store instructions and/or programs that are executable by control circuitry 420 for controlling the operation of main pump 112 and lubricant pump 113, including the selective operation of main pump 112 or lubricant pump 113. Memory 424, in some examples, can be described as a computer-readable storage medium. In some examples, a computer-readable storage medium can include a non-transitory medium. The term "nontransitory" can indicate that the storage medium is not embodied in a carrier wave or a propagated signal. In certain examples, a non-transitory storage medium can store data that can, over time, change (e.g., in RAM or cache). In some examples, memory 424 can include temporary memory, meaning that a primary purpose of the computer-readable memory is not long-term storage. Memory 424, in some examples, can be described as a volatile memory, meaning that the memory does not maintain stored contents when electrical power to the controller is removed. Examples of volatile memories can include random access memories (RAM), dynamic random-access memories (DRAM), static random-access memories (SRAM), and other forms of volatile memories. In some examples, memory 424 can be used to store program instructions for execution by one or more processors of the controller. For instance, memory 424 can be used by software or applications executed by the control circuitry 420 to temporarily store information during program execution. In some examples, memory 424 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

An operator can interact with controller 117 through user interface 428 to control the operation of main pump 112 and/or lubricant pump 113. User interface 428 can be an input/output device configured to provide and/or receive information from an operator. User interface 428 can be of any form that enables operator interaction with control circuitry 420. For example, control system 400 can implement a graphical user interface displayed at a display device of user interface 428 for presenting information to and/or receiving input from an operator. User interface 428 can include graphical navigation and control elements, such as graphical buttons or other graphical control elements presented at the display device. User interface 428, in some examples, includes physical navigation and control elements, such as physically actuated buttons or other physical navigation and control elements.

User interface 428 can be used to manually control the operation of main pump 112 and/or lubricant pump 113. Controller 117 can also be configured to automatically cause lubricant pump 113 to flow lubricant through lubricant system 110. Memory 424 can be encoded with instructions that allow controller 117 to automatically control the operation of main pump 112 and/or lubricant pump 113.

Figure 5:
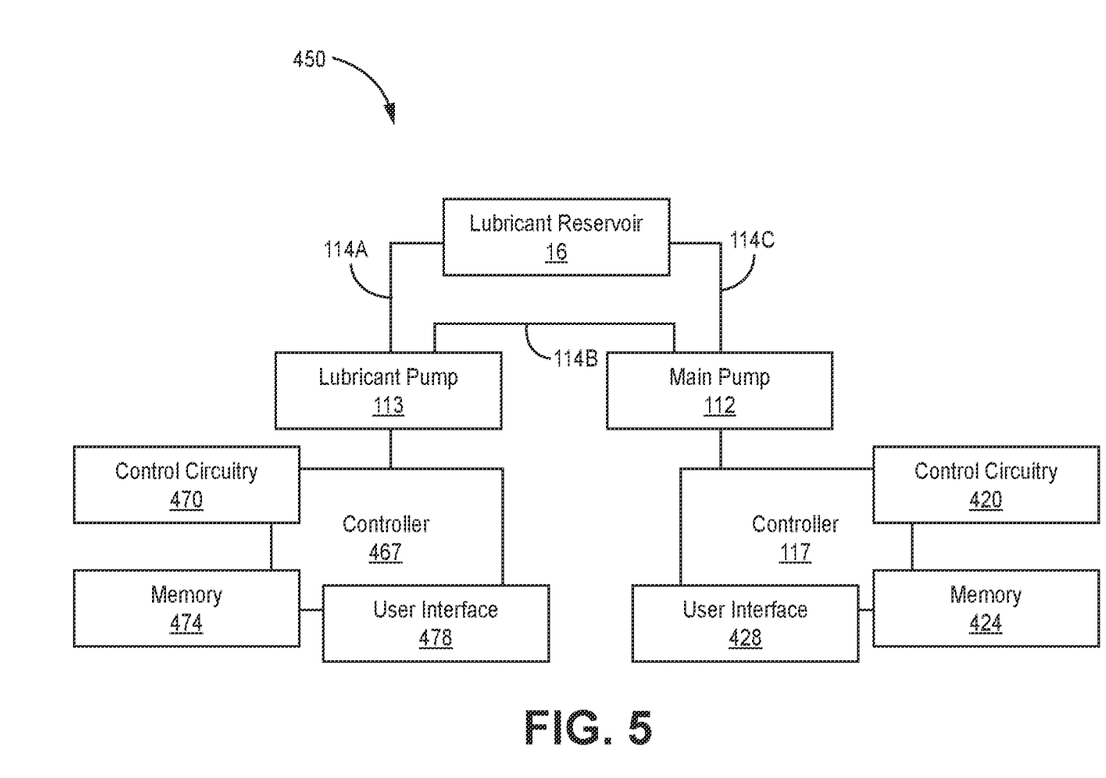
FIG. 5 is a schematic of a further example of a control system for controlling the operation of the lubricant system depicted in FIG. 2.

In some examples, controller 117 is two separate controllers two that each control one of main pump 112 and lubricant pump 113. FIG. 5 is a schematic depiction of control system 450, which is substantially similar to and includes the same components as control system 400 but also includes a separate controller 467 for controlling the operation of lubricant pump 113. Controller 467 is can perform substantially the same functions as controller 117, and includes control circuitry 470, memory 474, and user interface 478, which are substantially similar to control circuitry 420, memory 424, and user interface 428 described with respect to FIG. 4.

In control system 450, controller 117 only controls operation of main pump 112. Similarly, controller 467 only controls operation of lubricant pump 113. Using separate controllers 117 and 467 to control lubricant pump 113 and main pump 12 allows for lubrication system 110 to be installed on existing pumping systems without reconfiguring the controller operating the main pump, allowing lubrication system 110 to be used on a wide variety of existing pumping systems. In some of these examples, controller 467 lacks memory 474 and control circuitry 470 is a timer circuit lacking a microprocessor. Using a simple timing circuit to control the operation of lubricant pump decreases the cost associated with installation of lubrication system 110 on an existing device. In these examples, user interface 478 can be one or more physical switches, buttons, knobs, or dials.

Control system 400 has been described with reference to lubrication system 110 and pump 112. However, it should be understood that control system 400 or 450 can also be used to control the operation of other fluid pump systems not described herein.

Advantageously, both control system 400 and control system 450 allow for independent control of main pump 112 and lubricant pump 113, and thereby allow for independent control of main pump 112 and lubricant pump 113. Further, control systems 400, 450 allow for main pump 112 and lubricant pump 113 to be controlled via operator input at user interfaces 428, 478, via pre-programmed instructions stored on memory 424, 474, or via a combination of operator input and pre-programmed instructions.

As described previously with respect to FIG. 3, main pump 112 can pump a catalyst that reacts with a resin material pumped by main pump 212 to form a plural component spray foam. Some catalyst materials are moisture-sensitive and can form crystals, granules, and other hard byproducts when exposed to moisture. For example, isocyanate is known to form hard and crystalline byproducts when exposed to moisture. While lubricant circulating through lubricant system 110 is generally an oil or another hydrocarbon, sufficient moisture can be present in the lubricant to cause moisture-sensitive materials that flow past throat seal 124 into lubricant gallery 130 to form hard byproducts.

The hard byproducts formed by moisture-sensitive materials can damage throat seal 124 and other components of main pump 112. Operation of lubricant pump 113 can remove hard byproducts and moisture-sensitive materials from lubricant gallery 130 and dilute them in lubricant reservoir 16. However, operation of lubricant pump 113 also causes agitation of lubricant flowing through lubricant system 110, introducing air into lubricant flowing through lubricant system 110. Moisture in the air can accelerate the rate at which the moisture-sensitive materials form hard, damaging byproducts.

Figure 6:
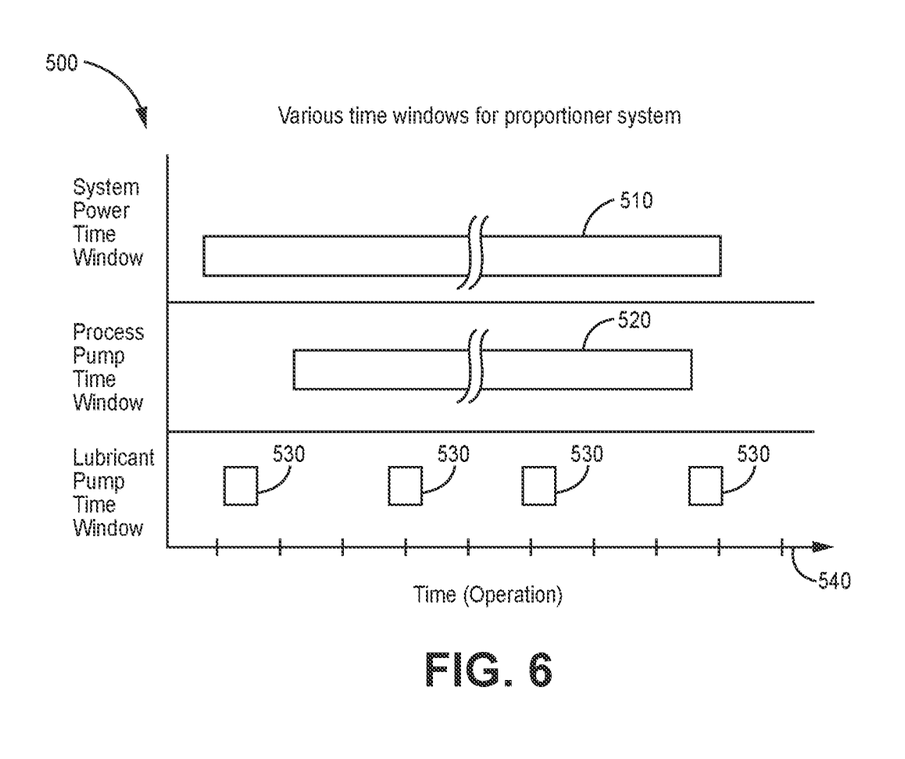
FIG. 6 is a chart of an example of a schedule for operating the control systems shown in FIGS. 4-5.

Advantageously, lubricant pump 113 can be operated intermittently to remove moisture sensitive-materials from lubricant gallery 130 while reducing agitation of the lubricant and thereby reducing the rate at which moisture-sensitive materials suspended in lubricant form undesirable hard byproducts. FIG. 6 is a schematic diagram of pump operation schedule 500, which can be used by control circuitry 420, 470 to minimize formation of undesirable hard byproducts by operating lubricant pump 113 intermittently. Pump operation schedule 500 includes bars 510, bars 520, bars 530, and time axis 540.

Pump operation schedule 500 describes an operation schedule of main pump 112, and lubricant pump 113 of proportioner system 200. Specifically, bars 510 represent time when proportioner system 200 is powered, bars 520 represent operation time of main pump 112, and bars 530 represent operation time of lubricant pump 113. The length of bars 510, 520, 530 along time axis 540 represent the relative operation time of proportioner system 200, main pump 112, and lubricant pump 113, respectively. As shown by bars 520, main pump 112 has a continuous operation period. Conversely, bars 530 shown that lubricant pump 113 has several intermittent operational periods.

The length of the operational period of lubricant pump 113, as represented by bars 530, is the length of time required for lubricant pump 113 to pump a purge volume of lubricant at a given pump rate. The purge volume is equal to the volume of lubricant gallery 130, inlet 132, outlet 134, and lubricant line 114B, such that pumping the purge volume completely replaces contaminated lubricant in lubricant gallery 130 with fresh lubricant from lubricant reservoir 16. Advantageously, operating lubricant pump 113 for only the time required to pump a purge volume of lubricant minimizes agitation of lubricant in lubricant gallery 130 while still allowing lubricant pump 113 to completely flush contaminated lubricant out of lubricant gallery 130. However, in other examples, the operational period of lubricant pump 113 may be sufficiently long that lubricant pump 113 can pump multiple purge volumes of lubricant during the operational period. For example, the operational period of lubricant pump 113 can be selected such that lubricant pump 113 pumps 1.5, 2, or 3 purge volumes during the operational period.

Between operational periods, lubricant pump 113 is inactive. The length of the inactive period between operational periods is selected such that lubricant pump 113 operates sufficiently frequently to reduce accumulation of undesirable contaminants in lubricant gallery and sufficiently infrequently to minimize lubricant agitation and thereby prevent formation of undesirable hard byproducts. To this extent, the length of the inactive period is dependent both on the rate of flow of the first component material across throat seal 124 and the rate of formation of undesirable hard byproducts in lubricant gallery 130, among other relevant parameters. Where the first material component is isocyanate, the length of the inactive period can be, for example, 30 minutes. The length of the inactive period can be constant or can vary based on operational needs.

In the example of pump operation schedule 500 shown in FIG. 6, lubricant pump 113 is active during one operational period before main pump 112 is operated. This initial operational period functions to as an initial purge of lubricant gallery 130 and removes contaminating particles (e.g., dust, the first component material, etc.) that has accumulated in lubricant gallery 130 while proportioner system 200 was inactive. As main pump 112 is operated, lubricant pump 113 is operated intermittently for operational periods offset by inactive periods. After main pump 112 has stopped operating, lubricant pump 113 is active during another operational period before proportioner system 200 is powered off. This final operational period functions as a final purge of lubricant gallery 130 before proportioner system 200 is set to an inactive state.

Operation schedule 500 can be preprogrammed and stored on memory 424, 474 for use by control circuitry 420, 470. Alternatively, control circuitry 420, 470 can be configured to automatically create operation schedule 500 during the operation of proportioner system 200 based on the volume of the lubricant gallery, the pump rate, the desired inactive period length, and operator or application preferences regarding initial and final lubricant purges.

An operator can interact with user interface 428, 478 to program or adjust one or more elements of operation schedule 500. Control circuitry 420, 470 can be configured to automatically adjust other elements of operation schedule 500 based on the operator input. For example, control circuitry 420, 470 can be configured to automatically cause lubricant pump 113 to perform an initial purge of lubricant gallery 130 after proportioner system 200 is powered on. Control circuitry 420, 470 can be configured to idle main pump 112 and lubricant pump 113 until operator input is received at user interface 428 indicating that main pump 112 should be operated. Control circuitry 420, 470 can then operate main pump 112 and lubricant pump 113 according to operation schedule 500 until input is received at user interface 428 indicating that main pump 112 should be idled. Control circuitry 420, 470 can then automatically cause lubricant pump 113 to perform a final purge of lubricant gallery 130 before proportioner system 200 is powered off.

Operation schedule 500 provides significant advantages. Specifically, operation schedule 500 can be used by control circuitry 420, 470 to intermittently operate lubricant pump 113. As described previously, intermittent operation of lubricant pump 113 allows for optimal reduction both of lubricant agitation and contaminant accumulation in lubricant gallery 130. Reducing lubricant agitation is particularly advantageous where main pump 112 is used to pump a moisture-sensitive material, such as isocyanate. Operation schedule 500 can further be used by control circuitry 420, 470 to cause lubricant pump 113 to perform an initial lubricant purge before main pump 112 is operated and a final lubricant purge after main pump 112 is idled.

Figure 7:
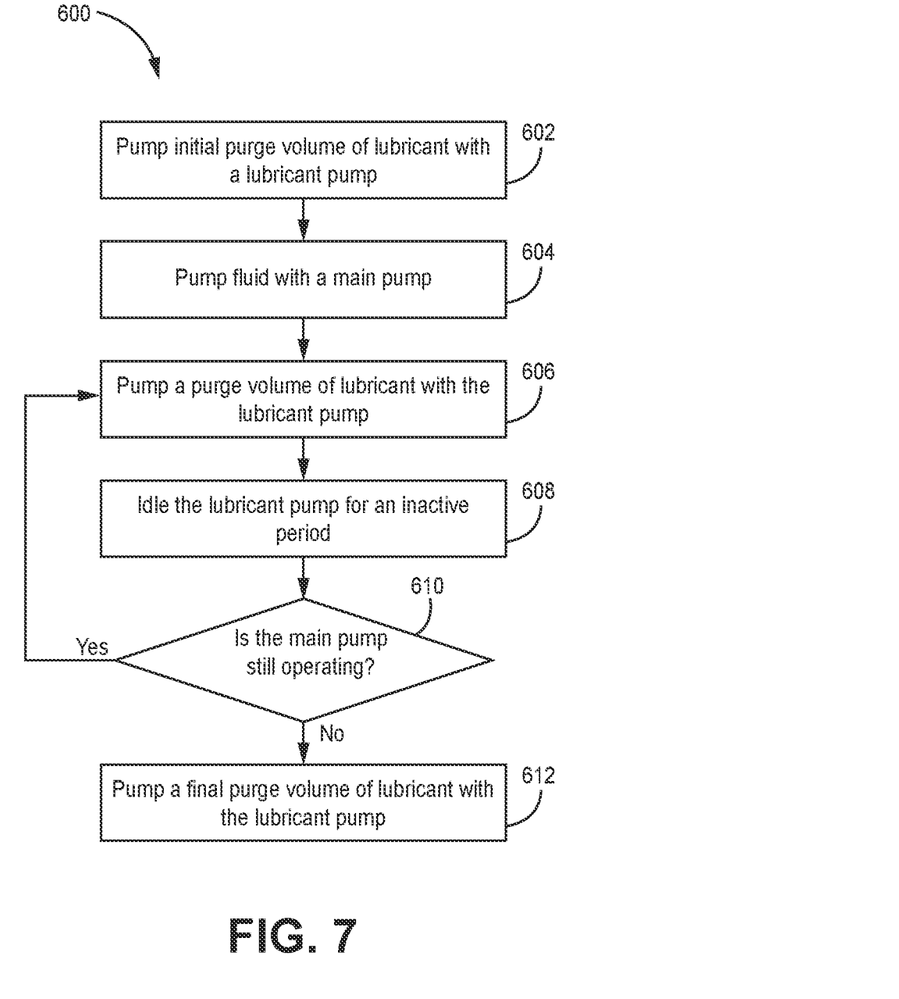
FIG. 7 is a flow diagram of an example of a method of operating lubricant system depicted in FIG. 2.

FIG. 7 is a flow chart depicting method 600, which can be used to operate a lubricant pump 113 intermittently. Method 600 has sequential steps 602-612, including pumping an initial purge volume of lubricant with a lubricant pump (step 602), pumping a process fluid with a main pump (step 604), pumping a purge volume of lubricant with the lubricant pump (step 606), idling the lubricant pump for an inactive period (step 608), determining whether the main pump is still operating (step 610), pumping a final purge volume of lubricant with the lubricant pump (step 612).

In step 602, an initial purge volume of lubricant is pumped with a lubricant pump. The lubricant pump is configured to pump the purge volume of lubricant to purge and replace lubricant stored in a lubricant gallery of a main pump. The lubricant pump and main pump are separate pumps and can be, for example lubricant pump 113 and main pump 112, respectively. The main pump can be a positive-displacement pump, such as a reciprocating pump. The lubricant pump can also be a positive-displacement pump, such as a peristaltic pump. The lubricant gallery is formed within the housing of the main pump and is separated from the pump chamber of the main pump by a throat seal. The throat seal reduces undesirable flow of process fluid or material from the pump chamber of the main pump toward, for example, a piston rod or other pump components. The lubricant gallery stores lubricant for lubricating the throat seal. The lubricant gallery can be, for example, lubricant gallery 130, and the throat seal can be, for example, throat seal 124.

The lubricant pump, lubricant gallery, and a lubricant reservoir form a lubricant system for circulating lubricant. Fresh lubricant is pumped from a lubricant reservoir and lubricant from the lubricant gallery flows to and is diluted in the lubricant reservoir. Dilution of lubricant from the lubricant gallery in the lubricant reservoir delays the onset of negative effects from contamination of lubricant with materials or process fluids pumped by the main pump. The lubricant pump, lubricant reservoir, and lubricant gallery are fluidly connected such that pumping action of the lubricant pump causes lubricant to flow in a circuit from the lubricant reservoir to the lubricant gallery and from the lubricant gallery to the lubricant reservoir. The purge volume is at least equal to the volume of the lubricant gallery. Advantageously, selecting a purge volume that is equal to the lubricant gallery minimizes unnecessary lubricant agitation, as described previously.

The initial purge volume pumped in step 602 functions to remove lubricant that may be contaminated by, for example, dust or the material pumped by the main pump that has accumulated while the main pump was inactive.

In step 604, a process fluid is pumped with the main pump. Step 604 is generally performed after the initial purge performed in step 602 is complete, such that lubricant in the lubricant gallery has been completely replaced prior to operation of the main pump. The process fluid pumped by the main pump can be, for example, a moisture-sensitive material that forms undesirable hard byproducts when agitated or exposed to moisture.

In step 606, the lubricant pump is operated to pump a purge volume of lubricant. Method 600 can proceed to step 606 immediately after step 604 or after a period of time equal to the inactive period (discussed with respect to step 608) after step 602 was performed. In step 608, the lubricant pump is idled for an inactive period. The length of the inactive period is dependent both on the rate of flow of the process fluid or material pumped by the main pump across the throat seal and the rate of formation of undesirable hard byproducts in the lubricant gallery, among other relevant parameters.

After the pump is idled for the inactive period in step 608, method 600 proceeds to step 610. In step 610, control circuitry determines whether the main pump is still operating. If the pump is still operating, control circuitry proceeds to step 606. In this manner, method 600 repeats steps 606 and 608 while the main pump is operating, ensuring that lubricant in lubricant pump is periodically purged during the operational period of the main pump. If the main pump is not operating, method 600 proceeds to step 612. In step 612, the lubricant pump pumps another purge volume of lubricant through the lubricant system, purging any contaminated lubricant from the lubricant gallery following the previous iteration of step 606.

Advantageously, method 600 can be performed by control circuitry to intermittently operate a lubricant pump. As described previously, intermittent operation of a lubricant pump allows for optimal reduction both of lubricant agitation and contaminant accumulation in a lubricant gallery of a main pump. Also as described previously, reducing lubricant agitation is particularly advantageous where the main pump is used to pump a moisture-sensitive material. Method 600 can further be used by control circuitry to cause a lubricant pump to perform an initial lubricant purge before the main pump is operated and a final lubricant purge after the main pump is idled.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump system comprising:
   a main pump configured to pump a fluid, the main pump comprising:
      a housing;
      a pump chamber defined by the housing; and
      a throat seal;
   a lubricant system comprising:
      a lubricant pump, wherein the lubricant pump is separated from the main pump and configured to pump a lubricant separate from the main pump;

a lubricant gallery defined within the housing of the main pump and having an inlet and an outlet;
a lubricant reservoir; and
a lubricant circuit fluidly connecting the lubricant pump, the lubricant reservoir, and the lubricant gallery, the lubricant circuit comprising:
a first lubricant line fluidly connecting the lubricant reservoir and the lubricant pump;
a second lubricant line fluidly connecting the lubricant pump and the inlet of the lubricant gallery; and
a third lubricant line fluidly connecting the outlet of the lubricant gallery and the lubricant reservoir;
wherein the throat seal is disposed adjacent to and between the pump chamber and the lubricant gallery; and
control circuitry configured to:
cause the lubricant pump to pump at least one initial purge volume of the lubricant through the lubricant system after the lubricant system is powered and before operation of the main pump;
cause the lubricant pump to stop pumping for a first time period after the lubricant pump has pumped the at least one initial purge volume; and
cause the lubricant pump to pump at least one first purge volume of lubricant through the lubricant system based on the first time period having elapsed and during operation of the main pump.

2. The pump system of claim 1, wherein the main pump is configured to pump a compound that is reactive with water.

3. The pump system of claim 1, wherein the first time period is selected to reduce lubricant pump wear.

4. The lubricant system of claim 1, wherein the first time period is 30 minutes.

5. The pump system of claim 1, wherein the lubricant pump is a peristaltic pump.

6. The pump system of claim 1, wherein the main pump is a reciprocating pump.

7. The pump system of claim 1, wherein the control circuitry is configured to cause the lubricant pump to pump the at least one initial purge volume by operating the lubricant pump for a purge time, wherein the purge time is selected based on a flow rate of the lubricant pump.

8. The pump system of claim 1, wherein the control circuitry is further configured to:
cause the lubricant pump to stop pumping for a second time period after the lubricant pump has pumped the at least one first purge volume and during operation of the main pump;
determine if the main pump is operating following the second time period; and
cause the lubricant pump, in response to determining operation of the main pump has ceased, to pump at least one final purge volume of lubricant through the lubricant system after the second time period and during a period of ceased operation of the main pump.

9. A pump control system comprising;
a main pump configured to pump a fluid, the main pump comprising:
a housing;
a pump chamber defined by the housing; and
a throat seal;
control circuitry configured to:
cause a lubricant pump, separate from the main pump, to pump at least one initial purge volume of lubricant through a lubricant system after the lubrication system is powered and before operation of the main pump, wherein the lubricant system comprises:
the lubricant pump;
a lubricant gallery defined by the housing; and
a lubricant circuit fluidly connecting the lubricant pump and the lubricant gallery,
wherein the throat seal is disposed adjacent to and between the pump chamber and the lubricant gallery;
cause the lubricant pump to stop pumping for a first time period after the lubricant pump has pumped the at least one initial purge volume;
cause the main pump to pump a fluid through the pump chamber after the lubricant pump has stopped pumping the at least one initial purge volume;
determine if the main pump is still operating following the first time period; and
cause, based on the control circuitry determining that the main pump is still operating, the lubricant pump to pump at least one first purge volume of lubricant through the lubricant system based on the first time period having elapsed and based on the main pump still operating.

10. The pump control system of claim 9, wherein each of the initial purge volume and the first purge volume is at least equal to a volume of the lubricant system.

11. The pump control system of claim 9, wherein the first time period is selected to reduce lubricant pump wear.

12. The pump control system of claim 9, wherein the control circuitry is further configured to:
cause the lubricant pump to pump the lubricant at a first rate; and
cause the main pump to pump the fluid at a second rate, wherein the first rate and the second rate are different.

13. The pump control of claim 9, wherein the control circuitry is further configured to:
cause the lubricant pump to stop pumping for a second time period after the lubricant pump has pumped the at least one first purge volume and during operation of the main pump;
determine if the main pump is operating following the second time period; and
cause the lubricant pump, in response to determining operation of the main pump has ceased, to pump at least one final purge volume of lubricant through the lubricant system after the second time period and during a period of ceased operation of the main pump.

14. A method of controlling a pump system, the method comprising:
operating a lubricant pump to pump at least one initial purge volume of lubricant through a lubricant system after the lubricant system is powered on and before operation of a main pump of the lubrication system, wherein the lubricant system comprises:
the lubricant pump;
a lubricant gallery having an inlet and an outlet and defined by a housing of the main pump, the main pump comprising:
a pump chamber defined by the housing; and
a throat seal disposed adjacent to and between the pump chamber and the lubricant gallery;
control circuitry configured to control operation of the lubricant pump independent of operation of the main pump; and
a lubricant circuit fluidly connecting the lubricant pump, a lubricant reservoir, and the lubricant gallery stopping operation of the lubricant pump for a first time period after the lubricant pump has pumped the at least one initial purge volume;

operating the main pump to pump a fluid; and operating the lubricant pump to pump at least one first purge volume of lubricant through the lubricant system based on the first time period having elapsed and based on the main pump still operating, wherein each of the initial purge volume and the first purge volume is equal to a volume of the lubricant gallery and the lubricant circuit.

15. The method of claim 14, wherein operating the lubricant pump to pump the at least one initial purge volume through the lubricant system comprises operating the lubricant pump for a purge time, wherein the purge time is selected based on a flow rate of the lubricant pump.

16. The method of claim 14, further comprising switching the lubrication pump to an idle mode after pumping the at least one first purge volume.

17. The method of claim 14, wherein the first time period is selected to reduce lubricant pump wear.

18. The method of claim 14, wherein the main pump is configured to pump a compound that is reactive with water.

19. The method of claim 14 and further comprising:

stopping operation of the lubricant pump for a second time period after the lubricant pump has pumped the at least one first purge volume and during operation of the main pump;

determining if the main pump is operating following the second time period; and operating the lubricant pump, in response to determining operation of the main pump has ceased, to pump at least one final purge volume of lubricant through the lubricant system after the second time period and during a period of ceased operation of the main pump.

* * * * *